Patented June 13, 1939

2,162,211

UNITED STATES PATENT OFFICE 2,162,211

ORGANIC MERCURY COMPOUND

Carl N. Andersen, Wellesley Hills, Mass., assignor to Lever Brothers Company, a corporation of Maine No Drawing. Application December 23, 1937, Serial No. 181,325

11 Claims. (Cl. 260—434)

The present invention relates to certain new aromatic mercury salts of sulfonamido substituted aromatic acids.

It is an object of my invention to produce such new organic mercury compounds useful as germicides and for other therapeutic purposes.

I have discovered that when the hydrogen atom of an acidic group or groups in a sulfonamido substituted aromatic acid is replaced by the essential radical of certain aromatic mercury compounds, compounds are produced which have extraordinarily high potency as antiseptics and germicides and at the same time are characterized by relatively low toxicity and other desirable properties.

The compounds I have produced may be described as having the general formula $(RHg)_x.R_1$, in which R represents an aromatic structure to a carbon atom of which the mercury is directly attached; in which $R_1$ represents a sulfonamido substituted aromatic acid radical that is linked to the RHg group or groups through the replacement of the hydrogen atom of the acidic group or groups; and in which $x$ represents the number of RHg groups in the compound and is an integer of at least one and not more than the number of acidic hydrogens in the sulfonamido substituted aromatic acid. While the words "group" and "groups" are used hereinafter, it will be understood that these words must be interpreted as single or plural depending upon the value of $x$.

More particularly, R represents an aromatic structure, which may be an aromatic nucleus with or without side chains, and the expression "aromatic structure" used herein is intended to be generic and include an aromatic nucleus with or without side chains. The aromatic structure is of the type in which none of the nuclear or side chain carbon atoms has direct linkage with any element other than hydrogen, carbon or mercury. R may stand for any mono- or polycyclic hydrocarbon group in which all of the nuclear carbon atoms, other than the one attached to mercury, and any side chain carbon atoms, have their valences satisfied either by carbon or hydrogen. Examples are the phenyl, diphenyl, tolyl, xylyl and naphthyl groups.

$R_1$ represents the radical of any sulfonamido substituted aromatic acid, i. e., an aromatic acid containing the group —$SO_2NH_2$ substituted for nuclear hydrogen. The sulfonamido group may have one or both of its hydrogens replaced by any monovalent radical, and such substituted sulfonamido groups are regarded as within the generic expression "sulfonamido". The acids may be either mono- or polybasic and may contain one or more substituted sulfonamido groups. The acids may be mono- or polynuclear and the acidic group or groups and the sulfonamido group or groups may be attached to the same or different nuclei. Saturated or unsaturated side chains may be attached to the nucleus and the acid radical or sulfonamido radical may be attached to either the side chain or the nucleus. Groups other than the sulfonamido group may be substituted in the acid, for example, the halogens and the nitro group, along with the sulfonamido group. The acidic hydrogen may be contained in any acid radical such as the carboxylic, sulphonic, etc.

The method by which the compounds are prepared, together with the number of compounds I have investigated, shows that all of the acids of the generic group heretofore defined may be employed to produce my novel aromatic mercury salts. The compounds so prepared have in greater or lesser degree, but always in a relatively high degree, antiseptic and germicidal properties. I, therefore, regard my invention as generic to and including the entire group of aromatic mercury salts of sulfonamido substituted aromatic acids of the above defined type.

The general method of producing these salts consists in reacting together a sulfonamido substituted aromatic acid and a compound containing an aromatic mercury radical of the above defined type. A liquid reacting medium is employed. The compound resulting from the reaction is usually relatively insoluble as compared with the reacting components and upon its precipitation may be filtered, washed and dried. The aromatic mercury compound I prefer is the hydroxide because in the reaction of the hydroxide with the acid, water is the only other product produced and the resulting aromatic mercury salt may be easily purified. My novel compounds may also be prepared by employing any soluble aromatic mercury salt, for example, the acetate or lactate in a reaction with the sulfonamido substituted aromatic acid. The aromatic mercury salts formed during the reaction are of a relatively low solubility as compared with the sulfonamido substituted aromatic acids and with the aromatic mercury salts formed during the reaction. Compounds may also be prepared by reacting an acid derivative, such as a salt, ester or anhydride, with an aromatic mercury hydroxide or salt to form the corresponding aromatic mercury salt. Any of these general methods may be employed in producing the compounds comprising this invention.

In any of these methods, the substituted sulfonamido group or groups do not enter into the reaction. The structure of the compounds remains the same except for the replacement of the acidic hydrogen or hydrogens by the aromatic mercury group or groups.

Any inert liquid may be used as the medium for carrying out the reaction, inasmuch as its only function is to bring the reacting components together. Water is convenient to use because of its availability. Other solvents are equally as satisfactory, such as alcohol, acetone, benzol, and other inert organic solvents or mixtures of any of these materials with each other or with water. Alcohol is convenient to use because the reacting components are relatively more soluble therein and smaller quantities of solution are necessary for the preparation of a given amount of the product.

The process may be carried out at any temperature, for example, room temperature and it is not dependent upon the use of an elevated temperature. In most instances I find, however, that the use of heat facilitates the solution of reacting components and permits the use of solutions of greater concentration.

The reacting materials are generally employed in substantially theoretical quantities. In some cases, if desired, approximately 10% excess of the acid may be employed in order to insure complete conversion of the aromatic mercury compound.

If the acid employed is a polybasic acid, one or more, including all of the acidic hydrogens may be replaced by the aromatic mercury radical. The number of hydrogens replaced is dependent upon the amounts of the reacting components. If less than all of the acidic hydrogens are replaced, the corresponding acid salts will be formed.

If desired, one or both of the hydrogens in the sulfonamido group may also be replaced if sufficient quantity of the aromatic mercury reacting compound is employed.

Mixed salts in which the acidic hydrogens are replaced by different radicals may be prepared, and in the case of polybasic acids containing three or more acidic hydrogen atoms, mixed acid salts may be prepared. Mixed salts may be prepared in which different aromatic mercury radicals replace the acidic hydrogen, but the mixed salts may have any positive radical, in particular, alkali metals, attached to the acid radical along with the aromatic mercury radical. Compounds of the latter type may be prepared by reacting an alkali metal acid salt of a sulfonamido acid with the aromatic mercury compound, or an alkali metal base may be reacted with the acid along with the aromatic mercury compound.

The following acids are illustrative of the class heretofore defined: o-sulfonamido benzoic acid, p-ethyl sulfonamido benzoic acid, p-sulfonamido benzoic acid, sulfonamido naphthoic acid, sulfonamido naphthalic acid, sulfonamido phthalic acid, disulfonamido benzoic acid, and sulfonamido trimesic acid.

The following examples are given as illustrative of the preferred method of preparing the compounds and an illustrative of representative organic mercury compounds falling within the generic class heretofore described as constituting my invention:

*Example I*

20.16 grams of phenylmercury acetate is dissolved in two liters of water and heated to boiling until solution is complete. The solution is filtered and to the filtrate is added 12.06 grams of o-sulfonamido benzoic acid. A precipitate is formed and the mixture is allowed to stand for twelve hours, after which it is filtered. The precipitate is washed well with water and alcohol and then recrystallized. It has a melting point of 142–143° C. and is the compound phenylmercury o-sulfonamido benzoate.

*Example II*

22.9 grams of p-ethyl sulfonamido benzoic acid is dissolved in 200 cc. of ethyl alcohol, and to this solution is added an alcoholic solution containing 29.4 grams of phenylmercury hydroxide. The mixture is agitated on a steam bath for one-half hour and then allowed to cool. Upon cooling, a well defined crystalline mass is obtained which is separated by filtration, washed with warm water, and then recrystallized from alcohol. The precipitate is the compound phenylmercury p-ethyl sulfonamido benzoate and does not melt when heated up to 240° C.

*Example III*

8.8 grams of phenylmercury hydroxide is dissolved in 400 cc. of hot water and filtered. To the filtrate is added an aqueous solution containing 6.7 grams of p-sulfonamido benzoic acid. The material is concentrated to a small volume and a white crystalline material separates. The mixture is allowed to cool, after which it is filtered. The precipitate is then recrystallized from a large volume of alcohol. It is the compound phenylmercury p-sulfonamido benzoate and does not melt when heated up to 260° C.

*Example IV*

2.51 grams of the sulfonamide of naphthoic acid is dissolved in 200 cc. of alcohol and to the solution is added 2.94 grams of phenylmercury hydroxide dissolved in 400 cc. of water. A precipitate results. The mixture is allowed to cool, after which it is filtered and the precipitate washed with water and dried. After recrystallization from alcohol the material melts at 122° C. and is the compound phenylmercury sulfonamido naphthoate.

*Example V*

18 grams of phenylmercury hydroxide is dissolved in 500 cc. of water and the solution heated to boiling. The solution is filtered and to the filtrate is added 10 grams of the ammonium salt of the sulfonamide of naphthalic acid dissolved in 150 cc. of alcohol and 100 cc. of benzol. A precipitate is formed and the benzol is distilled off. A white precipitate results upon cooling, after which it is removed by filtration, washed with alcohol, dried, and recrystallized from alcohol. The material sinters at 193° C. and melts at 225–226° C. It is the compound di(phenylmercury) sulfonamido naphthalate.

*Example VI*

5.88 grams of phenylmercury hydroxide is dissolved in 100 cc. of water and the solution filtered. To the filtrate is added 2.8 grams of the ammonium salt of the sulfonamide of phthalic acid dissolved in 500 cc. of alcohol. A white precipitate results and the mixture is allowed to cool, after which the precipitate is separated by filtration, washed with water and alcohol, dried, and recrystallized. It has a melting point of 234.5° C. and is the compound di(phenylmercury) sulfonamido phthalate.

From the description of the specific examples, it will be readily apparent to one skilled in the art how other members of the above identified group may be reacted with an aromatic mercury compound to produce the other mercury compounds of analogous structure which are within the scope of my invention.

The compounds produced as above described are characterized by extraordinarily high potency as antiseptics and germicides. Tests in accordance with Circular 198, of the U. S. Dept. of Agriculture, described as F. D. A. method clearly indicate this excellence.

Thus, after an exposure of 15 minutes an aqueous solution of phenylmercury o-sulfonamido benzoate killed standard cultures of *Eberthella typhi* (typhoid bacillus) at 37° C. in dilutions as great as 1:70,000. When tested against *Staphylococcus aureus* by the same method and at the same temperature the compound killed this organism after a 15 minute exposure in a dilution of 1:30,000.

In addition to these germicidal properties, all of these compounds are characterized by relatively low toxicity. Because of these properties it is possible to use them in extreme dilutions and in many situations where known germicides, because of toxic or other undesirable properties, cannot be employed. They may be used externally and locally and in some cases administered internally with satisfactory results from the germicidal standpoint and without harmful effect.

The compounds retain their germicidal activity when incorporated in soap and various menstruums employed in preparing germicidal compositions.

When these new compounds are to be used directly as germicides they may be employed in aqueous or other solutions, or they may be formed into various preparations such as mouth washes, tooth pastes, soaps, ointments, etc.

I claim:

1. An organic mercury compound having the general formula $(RHg)_x.R_1$, in which R represents an aromatic structure to a carbon atom of which the mercury is directly attached and in which none of the carbon atoms has direct linkage with any element other than hydrogen, carbon and mercury; in which $R_1$ represents a sulfonamido substituted aromatic carboxylic acid radical that is linked to the RHg group through replacement of acidic hydrogen; and in which $x$ represents the number of RHg groups in the compound and is an integer of at least one and not more than the number of carboxyl groups in the radical $R_1$.

2. An organic mercury compound having the general formula $(RHg)_x.R_1$, in which R represents an aromatic structure to a carbon atom of which the mercury is directly attached and in which none of the carbon atoms has direct linkage with any element other than hydrogen, carbon and mercury; in which $R_1$ represents a sulfonamido substituted mononuclear aromatic carboxylic acid radical that is linked to the RHg group through replacement of acidic hydrogen; and in which $x$ represents the number of RHg groups in the compound and is an integer of at least one and not more than the number of carboxyl groups in the radical $R_1$.

3. An organic mercury compound having the general formula $RHg.R_1$, in which R represents an aromatic structure to a carbon atom of which the mercury is directly attached and in which none of the carbon atoms has direct linkage with any element other than hydrogen, carbon and mercury; and in which $R_1$ represents a sulfonamido substituted benzoic acid radical that is linked to the RHg group through replacement of carboxyl hydrogen.

4. An organic mercury compound having the general formula $(RHg)_x.R_1$, in which R represents an aromatic structure to a carbon atom of which the mercury is directly attached and in which none of the carbon atoms has direct linkage with any element other than hydrogen, carbon and mercury; in which $R_1$ represents a sulfonamido substituted polynuclear aromatic carboxylic acid radical that is linked to the RHg group through replacement of acidic hydrogen; and in which $x$ represents the number of RHg groups in the compound and is an integer of at least one and not more than the number of carboxyl groups in the radical $R_1$.

5. An organic mercury compound having the general formula $(C_6H_5Hg)_x.R_1$, in which $R_1$ represents a sulfonamido substituted aromatic carboxylic acid radical that is linked to the $C_6H_5Hg$ group through replacement of acidic hydrogen; and in which $x$ represents the number of $C_6H_5Hg$ groups in the compound and is an integer of at least one and not more than the number of carboxyl groups in the radical $R_1$.

6. An organic mercury compound having the general formula $(C_6H_5Hg)_x.R_1$, in which $R_1$ represents a sulfonamido substituted mononuclear aromatic carboxylic acid radical that is linked to the $C_6H_5Hg$ group through the replacement of acidic hydrogen; and in which $x$ represents the number of $C_6H_5Hg$ groups in the compound and is an integer of at least one and not more than the number of carboxyl groups in the radical $R_1$.

7. An organic mercury compound having the general formula $C_6H_5Hg.R_1$, in which $R_1$ represents a sulfonamido substituted benzoic acid radical that is linked to the $C_6H_5Hg$ group through the replacement of carboxyl hydrogen.

8. An organic mercury compound having the general formula $(C_6H_5Hg)_x.R_1$, in which $R_1$ represents a sulfonamido substituted polynuclear aromatic carboxylic acid radical that is linked to the $C_6H_5Hg$ group through the replacement of acidic hydrogen; and in which $x$ represents the number of $C_6H_5Hg$ groups in the compound and is an integer of at least one and not more than the number of carboxyl groups in the radical $R_1$.

9. Phenylmercury o-sulfonamido benzoate.

10. An organic mercury compound having the general formula $(C_6H_5Hg)_2.R_1$, in which $R_1$ represents a sulfonamido naphthalic acid radical that is linked to the $C_6H_5Hg$ groups by the replacement of carboxyl hydrogens.

11. An organic mercury compound having the general formula $(C_6H_5Hg)_2.R_1$, in which $R_1$ represents a sulfonamido phthalic acid radical that is linked to the $C_6H_5Hg$ groups by the replacement of carboxyl hydrogens.

CARL N. ANDERSEN.